United States Patent [19]

Fujimura et al.

[11] Patent Number: 5,702,572
[45] Date of Patent: Dec. 30, 1997

[54] METHOD FOR TREATING EXHAUST GASES AND FOUL WATER

[75] Inventors: Hiroyuki Fujimura, Tokyo; Takayuki Suzuki, Kanagawa-ken; Norio Yamada; Yoshiyuki Ichiki, both of Tokyo; Akihiko Maezawa; Hideo Hayashi, both of Kanagawa-ken, all of Japan

[73] Assignee: Ebara Corporation, Tokyo, Japan

[21] Appl. No.: 757,736

[22] Filed: Nov. 26, 1996

[30] Foreign Application Priority Data

Nov. 27, 1995 [JP] Japan .................. 07-329458

[51] Int. Cl.⁶ .............. C07C 1/00; B01D 53/00; C02F 3/00; C02F 3/30
[52] U.S. Cl. ................. 204/157.15; 204/157.3; 204/157.46; 204/158.2; 210/603; 210/605; 210/631; 95/2
[58] Field of Search ............ 204/157.15, 157.3, 204/157.46, 158.2; 210/603, 605, 631; 95/2

[56] References Cited

U.S. PATENT DOCUMENTS

| | | | |
|---|---|---|---|
| 4,097,349 | 6/1978 | Zenty | 204/158 R |
| 4,294,674 | 10/1981 | Aoki et al. | 204/157.1 H |
| 4,324,759 | 4/1982 | Aoki et al. | 422/62 |
| 4,416,748 | 11/1983 | Stevens | 204/157.1 P |
| 4,435,260 | 3/1984 | Koichi et al. | 204/164 |
| 4,882,020 | 11/1989 | Maezawa et al. | 204/157.3 |
| 4,952,231 | 8/1990 | Kaneko et al. | 71/59 |
| 4,961,830 | 10/1990 | Aoki et al. | 204/157.3 |
| 4,969,984 | 11/1990 | Kawamura et al. | 204/157.3 |
| 5,041,271 | 8/1991 | Aoki et al. | 423/235 |
| 5,244,552 | 9/1993 | Namba et al. | 204/157.3 |
| 5,257,588 | 11/1993 | Kollmann | 110/345 |

FOREIGN PATENT DOCUMENTS 56-124822  9/1981  Japan .

OTHER PUBLICATIONS

G. Saracco and G. Genon, "High temperature ammonia stripping and recovey from process liquid wastes", Journal of Hazardous Materials, vol. 37, pp. 191-206 no month, 1994.

Japan Abstract 56 124822, 30 Sep. 1981.
Japan Abstract 06 071293, 15 Mar. 1994.
Japan Abstract 58 101728, 17 Jun. 1983.

*Primary Examiner*—Kathryn L. Gorgos
*Assistant Examiner*—Edna Wong
*Attorney, Agent, or Firm*—Browdy and Neimark

[57] ABSTRACT

The improved method of treating an exhaust gas from a combustion apparatus comprises adding ammonia to the exhaust gas and then irradiating it with an electron beam, characterized in that part or all of said ammonia is supplied as a separated portion of ammonia-containing water. The ammonia-containing foul water may contain feces excreted from humans and/or domestic animals and poultry, fermentation industry liquid waste or food processing wastewater. The organic waste-containing water may be digested anaerobically to convert the organic matter to methane gas and, subsequently, ammonia is separated from the supernatant liquor and used as the source of ammonia to be supplied. The methane gas is suitably used as a source of energy for the combustion apparatus. At least part of the organic matter in the organic foul water may be decomposed oxidatively and, subsequently, ammonia is separated for use as the source of ammonia to be supplied. The method is capable of simultaneous treatment of the exhaust gas and the ammonia-containing water in an efficient economical manner.

5 Claims, 3 Drawing Sheets

METHOD FOR TREATING EXHAUST GASES AND FOUL WATER

BACKGROUND OF THE INVENTION

This invention relates to a method for treating exhaust gases and ammonia-containing foul water while producing a fertilizer.

Exhaust gases from waste incineration facilities, boilers and other types of combustion equipment often contain high levels of SOx, NOx and other air pollutants that are potentially hazardous to humans, animals and poultry depending on the nature of the waste, as well as the type of fuels and the conditions of incineration or burning. The SOx-containing exhaust gases are conventionally treated by a dry or wet method using slaked lime as an absorber. The NOx-containing exhaust gases are commonly treated by a technique that uses ammonia as a reducing agent for degrading NOx into harmless water and nitrogen gas.

According to a recent field-proven method, a SOx- or NOx-containing exhaust gas is exposed to electron beams to generate active species (OH, 0 and $HO_2$), which oxidize the SOx and NOx molecules into sulfuric acid and nitric acid, respectively, to produce ammonium compounds (ammonium sulfate and ammonium nitrate) due to concomitant ammonia, which are subsequently separated from the exhaust gas. This method is not only capable of simultaneous removal of SOx and NOx but it also yields ammonium sulfate and ammonium nitrate as by-products which are useful as fertilizers. Because of these advantages, the method draws attention as a completely new technology for preventing air pollution. However, problem with this method is its high ammonia requirement since ammonia is necessary for treating SOx as well as NOx.

In the prior art of a process for treating exhaust gases containing SOx and/or NOx which comprises irradiating the exhaust gases with electron beams in the presence of ammonia to produce $NH_4SO_4$ and/or $NH_4NO_3$, improvements for the above process are proposed in the technology "spraying cooling water upon irradiated exhaust gases, thereby adjusting the exhaust gas temperature at the outlet of a dust collector" (U.S. Pat. No. 4,882,020); in the technology "feeding exhaust gases from a rector at a flow velocity no more than 10 m/sec until exhaust gases reaches a by-product collector, thereby inhibiting adhesion of by-products inside a duct" (U.S. Pat. No. 4,961,830); in the technology "passing a resultant gas containing fine particulate products through an electrostatic precipitator and passing gas containing particles discharged from the electrostatic precipitator into a mechanical filter" (U.S. Pat. No. 4,969,984); in the technology "in order to reduce leakage of ammonia, adding an alkaline substance in the form of a powder exclusive of ammonia wherein the amount of the alkaline substance added is equal to or more than an amount determined on the basis of the concentration of SOx and NOx which are left unreacted due to a lack of ammonia" (U.S. Pat. No. 5,041,271); and in the technology "the residence time of waste gases in a non-irradiation zone between two neighboring electron beam irradiation zones is 0.01–0.05 sec" (U.S. Pat. No. 5,244,552).

When hot exhaust gases are exposed to electron beams, they must be cooled to a specified temperature by suitable means such as cooling water, so the method under consideration is not practically feasible in locations where industrial water is either impossible to acquire or only obtainable at high cost.

Ammonia-containing water occurs as two types: inorganic liquid waste such as results from the manufacture of fertilizers or pigments, and organic liquid waste such as wastewater from coke production, night soil, cattle or poultry raising wastewater, food processing wastewater and fermentation industry wastewater. The nitrogen in these types of wastewater is a cause of eutrophication ("red tide" or "blue tide") which causes considerable damage in closed bodies of water, so it is required to remove nitrogen from wastewater in such regions, and consequently facilities of wastewater treatment having a capability of nitrogen removal have been constructed at several locations.

In particular, organic liquid wastes such as night soil, cattle or poultry raising wastewater, food processing wastewater and fermentation industry wastewater contain high levels of organic matter and have high BOD levels thereby exerting an excessive pollution load on a receiving body of water. Besides nitrogen, the organic liquid wastes contains high levels of phosphorus, which is a factor in accelerating the progress of eutrophication.

Biological denitrification is commonly adopted in Japan as a method of nitrogen removal. Another effective method of nitrogen treatment is ammonia-stripping; compared to the biological denitrification method, ammonia-stripping requires a simple stripping apparatus and yet is capable of separating ammonia from water within an extremely short period of time. Notwithstanding these advantages, the ammonia-stripping method is seldom used in practice and the reason is as follows: in the biological denitrification method, ammonia is eventually degraded to innocuous nitrogen and water but in the ammonia-stripping method, ammonia is merely separated from water and must subsequently be degraded by another system which requires huge investment and operating costs.

A prior art reference that teaches the ammonia-stripping method is G. Saracco and G. Genoh, High Temperature Ammonia Stripping and Recovery From Process Liquid Wastes, Journal of Hazardous Materials, 37 (1994), 191–206. It discloses that ammonia is discharged and removed from ammonia-containing waste water and the discharged ammonia is recovered as ammonium sulfate.

Human night soil and cattle or poultry feces contain high levels of organic matter and nitrogen. From an energy viewpoint, it is more economical to treat this liquid waste by an anaerobic digestion system than an aerobic approach (such as an activated-sludge treatment method). However, in anaerobic digestion, most of the organic matter (BOD source) present is converted to methane gas, so it is not economically feasible to perform biological denitrification on the supernatant liquor although detailed reasons are not mentioned here. In view of its nature, the supernatant liquor is suitably denitrified by ammonia-stripping but this method is seldom used commercially for the reasons already set forth above.

As a further problem, the methane gas produced in the anaerobic digestion tank contains hydrogen sulfide at high levels (about 10,000 ppm), so its subsequent utilization requires the installation of a desulfurizer with periodic replacements of the thereof.

The phosphorus in organic liquid waste is conventionally removed by a combination of biological treatment with agglomeration that is caused under acidic conditions by the addition of an aluminum- or iron-based acidic inorganic flocculants. A problem with this method is that if residual ammonia is present in the biologically treated water, its alkalinity is increased to require further addition of the flocculant. Another problem is that since the flocculated sludge is produced in a large amount and can be dehydrated only poorly, considerable difficulty is entailed in its treatment.

SUMMARY OF THE INVENTION

An object, therefore, of the present invention is to provide an efficient and economical solution to the problems encountered in the prior art methods of treating exhaust gases by exposure to an electron beam and for the treatment of ammonia-containing foul water, such as to produce clean treated gases and water, and also yielding ammonium sulfate and/or ammonium nitrate which are useful as fertilizers, and optionally producing phosphorus-containing solid matter.

The stated object of the invention can be attained by a method of treating an exhaust gas from a combustion apparatus which comprises adding ammonia to said exhaust gas and then irradiating said exhaust gas with an electron beam, characterized in that part or all of said ammonia is supplied as a separated portion of ammonia-containing water.

In one embodiment, the ammonia-containing water is water containing organic waste such as feces excreted from humans and/or domestic animals and poultry, fermentation industry liquid waste or food processing wastewater.

In another embodiment, the water containing organic waste is digested anaerobically to convert the organic matter to methane gas and, subsequently, ammonia is separated from the supernatant liquor and used as the source of the ammonia to be supplied.

In yet another embodiment, the methane gas is used as a source of energy for the combustion apparatus.

In still another embodiment, at least part of the organic matter in the water containing organic waste is decomposed oxidatively and, subsequently, ammonia is separated for use as the source of the ammonia to be supplied.

The present invention also provides an apparatus for implementing the above-described method.

THE PREFERRED EMBODIMENTS OF THE INVENTION

Figure 1:
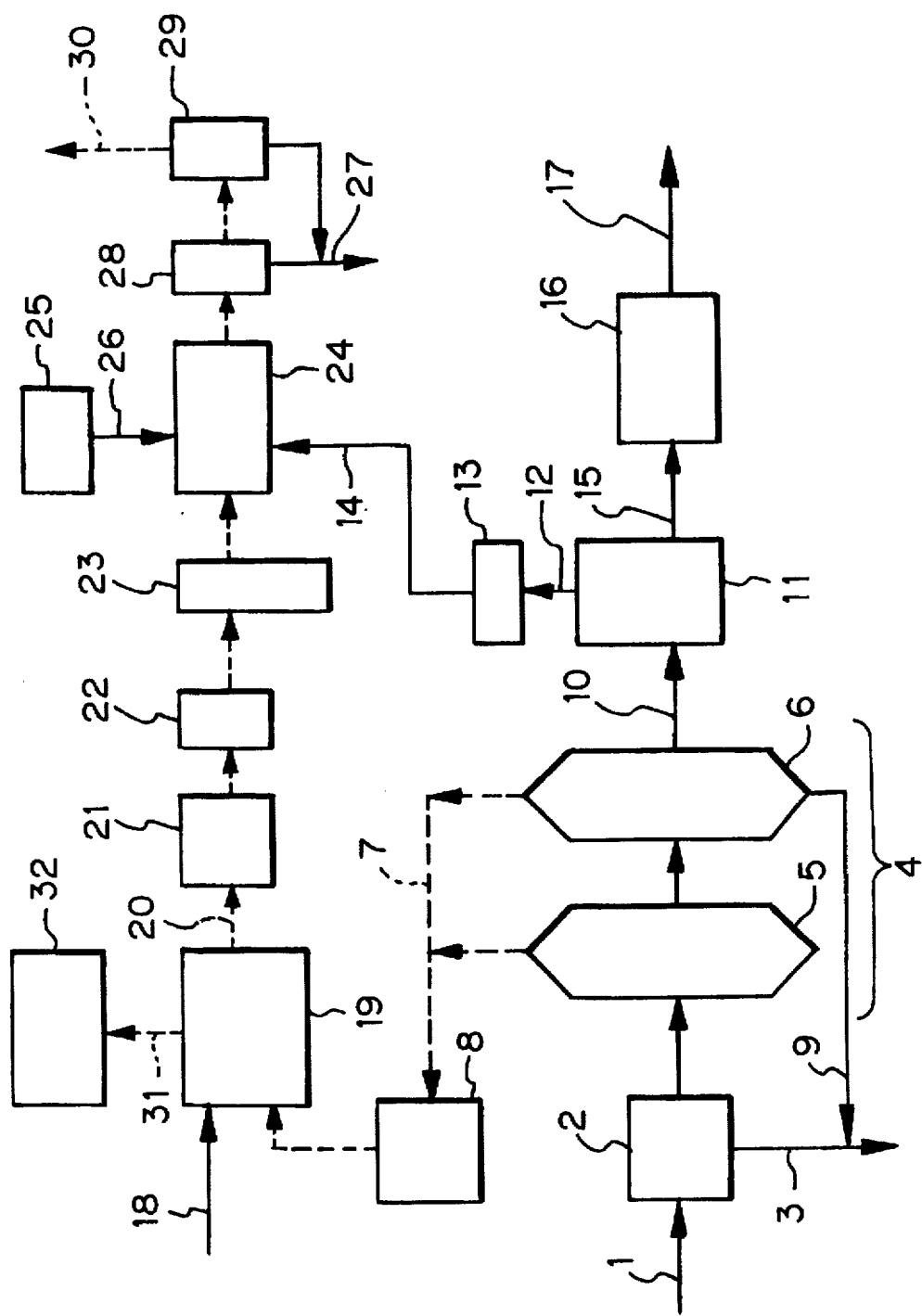
FIG. 1 is a flow sheet for the treatment of an exhaust gas from a boiler in a coal-fired thermal power plant, as well as the treatment of night soil according to an embodiment of the invention.

An embodiment of the present invention is its application to the treatment of an exhaust gas from a boiler in a coal-fired thermal power plant, as well as the treatment of night soil. This embodiment will now be described with reference to FIG. 1.

An influent of night soil 1 which is ammonia-containing water is fed to a pretreatment step 2, where it is freed of coarse solid matter 3; thereafter, the night soil is fed into an anaerobic digestion step 4 (consisting of the first tank 5 and the second tank 6), where the greater part of the organic matter in the night soil 1 is degraded into methane, carbon dioxide, water, etc. and the biogas 7 (methane and carbon dioxide) is transferred from the water into the vapor phase and leaves the anaerobic digestion step 4 to flow into a gas tank 8. Besides the dual-tank system shown in FIG. 1, the anaerobic digestion step 4 may employ any other known technique such as single-tank digestion and an UASB (upflow anaerobic sludge blanket) system. The anaerobic digestion step 4 is desirably performed by fermentation at a medium water temperature of 38°–40° C. but the biogas 7 can also be produced by high-temperature (55° C.) or low-temperature fermentation. For the period of treatment, 15–30 days may be given as a guide figure in the case of dual-tank digestion. The digested sludge 9 settling in the anaerobic digestion step 4 may be withdrawn as appropriate. The dissolved ammonia will experience no changes under anaerobic conditions but it is fed into an ammonia-stripping step 11 together with a digested supernatant liquor 10 such that it is subjected to a conventional ammonia-stripping process (e.g. steam stripping, air stripping or vacuum distillation) and transferred into the vapor phase together with water vapor. Ammonia 12 in the vapor phase may be directly fed into an exhaust gas treatment step 24 but, alternatively, it may be fed, together with water vapor, into a condensation step 13 which is maintained at a sufficiently low temperature that it can be used as aqueous ammonia 14. The concentration and amount of the ammonia to be injected into the exhaust gas treatment step 24 vary with the SOx and NOx concentrations of the exhaust gas to be treated, so the amount of ammonia injection is appropriately and automatically adjusted on the basis of detected concentrations of SOx and NOx. If highly concentrated aqueous ammonia is necessary, the ammonia-stripping step may be carried out either with a conventional rectifying column that is furnished with a refluxing capability useful in the purification of solvents and the like or by means of a two- or three-stage concentrator which cyclically performs ammonia-stripping and condensation. For further enhanced treatment of BOD and other residual organic components in the ammonia-stripped water 15, the latter may be fed into an aerobic biological treatment step 16 such as activated-sludge treatment. Although not shown, the biologically treated water 17 may be subjected to a physicochemical treatment such as flocculation, filtration or adsorption on activated carbon, whereupon clean treated water of higher clarity can be obtained.

In another line of the process shown in FIG. 1, a coal feed 18 is used as a fuel for a boiler 19, which discharges an exhaust gas 20, which in turn is freed of dust particles with an electric precipitator 21, subjected to heat exchange with boiler air in an air preheater 22, has its temperature adjusted in a cooling tower 23 and fed into the exhaust gas treatment step 24, where ammonia gas or aqueous ammonia 14 is injected and the ehxuast gas is exposed to an electron beam 26 from an electron beam generator 25, thereby yielding ammonium compounds (ammonium sulfate and ammonium nitrate). The temperature in the cooling tower 23 is controlled at 55°–75° C. The temperature for the exhaust gas treatment step 24 cannot be specified since the dose of electron beam exposure is variable with the input SOx level but it is usually within the range of 50°–100° C. Needless to say, the amount of ammonia injection and the amounts of the by-product ammonium sulfate and ammonium nitrate vary with the SOx and NOx contents in the exhaust gas 20.

The gas in the exhaust gas treatment step 24 may be cooled by a spray of cooling water; if aqueous ammonia 14 is injected as the cooling water, ammonia and cooling water can be supplied simultaneously. The ammonium compounds 27 are trapped via an electric precipitator 28 and a bag filter 29 and the clean gas 30 is discharged into the air atmosphere. Except in the case where some difficulty occurs, the bag filter 29 may be omitted.

The biogas 7 may be utilized as a heat source for the boiler 19. The biogas 7 contains harmful gases such as hydrogen sulfide but in the present invention, the hydrogen sulfide is oxidized to sulfuric acid to be removed.

The steam 31 from the boiler 19 is supplied to a dynamo.

The coarse solid matter 3 and the digested sludge 9 may be dehydrated and composted to produce good fertilizers.

Ammonia can be separated and concentrated not only by ammonia-stripping but also by other known techniques such as electrodialysis and membrane separation technologies (for both liquids and gases).

We now describe another method by which aqueous ammonia to be supplied to the combustion apparatus can be produced from foul water. Liquid wastes of this type are commonly encountered in the inorganic industry including the manufacture of fertilizers, coke and pigments.

If the invention is to be applied to the treatment of metal cleaning wastewater and other kinds of ammonia-containing water that has a low pH due to the effects of concomitants and the like, alkali agents such as sodium hydroxide, calcium hydroxide and magnesium hydroxide must be added to ensure that the pH is maintained in the alkali range throughout the ammonia-stripping step. An embodiment of this practice will now be described with reference to FIG. 2. An influent of low pH (acidic) wastewater 40 is fed into a mixing tank 41, where an alkali agent 42 is added until the pH of the wastewater is shifted to the alkali side before it is fed into the ammonia-stripping step 11. The separated ammonia gas 12 is supplied into the exhaust gas treatment step 24 either directly or after it is condensed in a condensation step 13 together with the accompanying water vapor to form aqueous ammonia 14. The ammonia-stripped water 15 is fed into a pH adjusting tank 43, where it is neutralized with an acid 44 and discharged into a water course as treated water 45.

If the invention process is to be applied to night soil, cattle or poultry raising wastewater, semiconductor fabrication wastewater, food processing wastewater, fermentation industry wastewater and other kinds of ammonia-containing foul water that also contains acidic organic matter such as organic acids, the organic matter present may be preliminarily removed by a biological treatment or some other suitable means and this enables the desired alkalinity to be maintained in the subsequent ammonia-stripping step. This embodiment is shown in FIG. 1, where the organic matter is treated by anaerobic digestion. In place of anaerobic digestion, other known techniques of treating the organic matter may be employed, such as aerobic biological treatments (e.g. an activated-sludge method, aerobic digestion and biological film systems) and wet oxidation.

Yet another embodiment of the invention, in which it is applied to the treatment of an exhaust gas from a boiler at a coal-fired thermal power plant and to the treatment of night soil will now be described with particular reference to FIG. 3.

An influent of night soil 1 which is organic ammonia-containing water is fed to a pretreatment step 2, where it is freed of coarse solid matter 3; thereafter, the night soil 1 is fed into an anaerobic digestion step 4 (consisting of the first tank 5 and the second tank 6, where the greater part of the organic matter in the night soil 1 is degraded into methane, carbon dioxide, water, etc. and the biogas 7 (methane and carbon dioxide) is transferred from the water into the vapor phase and leaves the anaerobic digestion step 4 to flow into a gas tank 8. Besides the dual-tank system shown in FIG. 3, the anaerobic digestion step 4 may employ other known techniques such as single-tank digestion and an UASB (upward anaerobic sludge bed) system. The anaerobic digestion step 4 is desirably performed by fermentation at a medium water temperature of 38°–40° C. but the biogas 7 can also be produced by high-temperature (55° C.) or low-temperature fermentation. For the period of treatment, 15–30 days may be given as a guide figure in the case of dual-tank digestion. The digested sludge 9 settling in the anaerobic digestion step 4 may be withdrawn as appropriate. The dissolved ammonia will experience no changes under anaerobic conditions but is subjected to an ammonia-stripping step 11 together with a digested supernatant liquor 10 such that it is subjected to a conventional ammonia-stripping process (e.g. steam stripping, air stripping or vacuum distillation) and transferred into the vapor phase together with water vapor.

If desired, part of the exhaust gas 51 from the boiler 19 may be supplied into the ammonia-stripping step 11, by passing the electric precipitator 21, the air preheater 22, the cooling tower 23, and this is effective in saving the thermal energy required for ammonia-stripping. Lowering the vapor pressure of ammonia by heating is a desired method for achieving efficient ammonia-stripping. The greater part of the bypass gas is composed of noncondensable nitrogen gas and, hence, it is preferably supplied directly into the exhaust gas treatment step 24 without passing through a condensation step 13.

Ammonia 12 in the vapor phase may be directly fed into the exhaust gas treatment step 24 but, alternatively, it may be fed, together with water vapor, into the condensation step 13 which is maintained at a sufficiently low temperature that it can be used as aqueous ammonia 14.

For further enhanced treatment of BOD and other residual organic components in the ammonia-stripped water 15 leaving the ammonia-stripping step 11, these residual components may be fed into an aerobic biological treatment step 16 such as activated-sludge treatment. The biologically treated water 17 is further fed into a flocculation/separation step 46, where it is treated with a ferrous or aluminum-based acidic flocculant 48 to ensure that phosphorus which is a causative substance of eutrophication is removed almost completely. The flocculated sludge 47 of high water content which is produced in the flocculation/separation step 46 may be injected for cooling purposes into a cooling tower 23 and this helps not only to save the required amount of cooling water but also to dry the flocculated sludge which is not easy to dehydrate and which hence involves difficulty in its treatment. As a result, a solid fertilizer of high phosphorus content can be produced. Examples of the inorganic flocculant 48 include not only acidic substances but also alkaline ones such as slaked lime and magnesium hydroxide. If these alkaline inorganic flocculants are used, the flocculated sludge 47 will produce phosphorus-containing solid fertilizers which also contain Ca, Mg and other metal elements useful in soil conditioning or reforming. In the flocculation/separation step 46, various known separation techniques may be employed such as a settling tank and an ultrafiltration membrane.

Water 49 leaving the flocculation/separation step 46 is typically used as cooling water in the cooling tower 23. However, if this water contains high levels of NaCl which is deleterious to the cultivation of vegetables and other crops, the water may be subjected to a desalting treatment such as reverse osmosis or electrodialysis to produce desalted water, which can be safely used as cooling water. If the NaCl concentration in the water 49 is reasonably low, it may be directly used as cooling water without any problems.

An excess sludge 50 of high water content results from the biological treatment step 16 and this may also be used as cooling water in the cooling tower 23. The excess sludge 50 contains organic forms of nitrogen and phosphorus, so the dried solidification product of this sludge is effective as a slow-acting nitrogen and phosphorus fertilizer.

Figure 3:
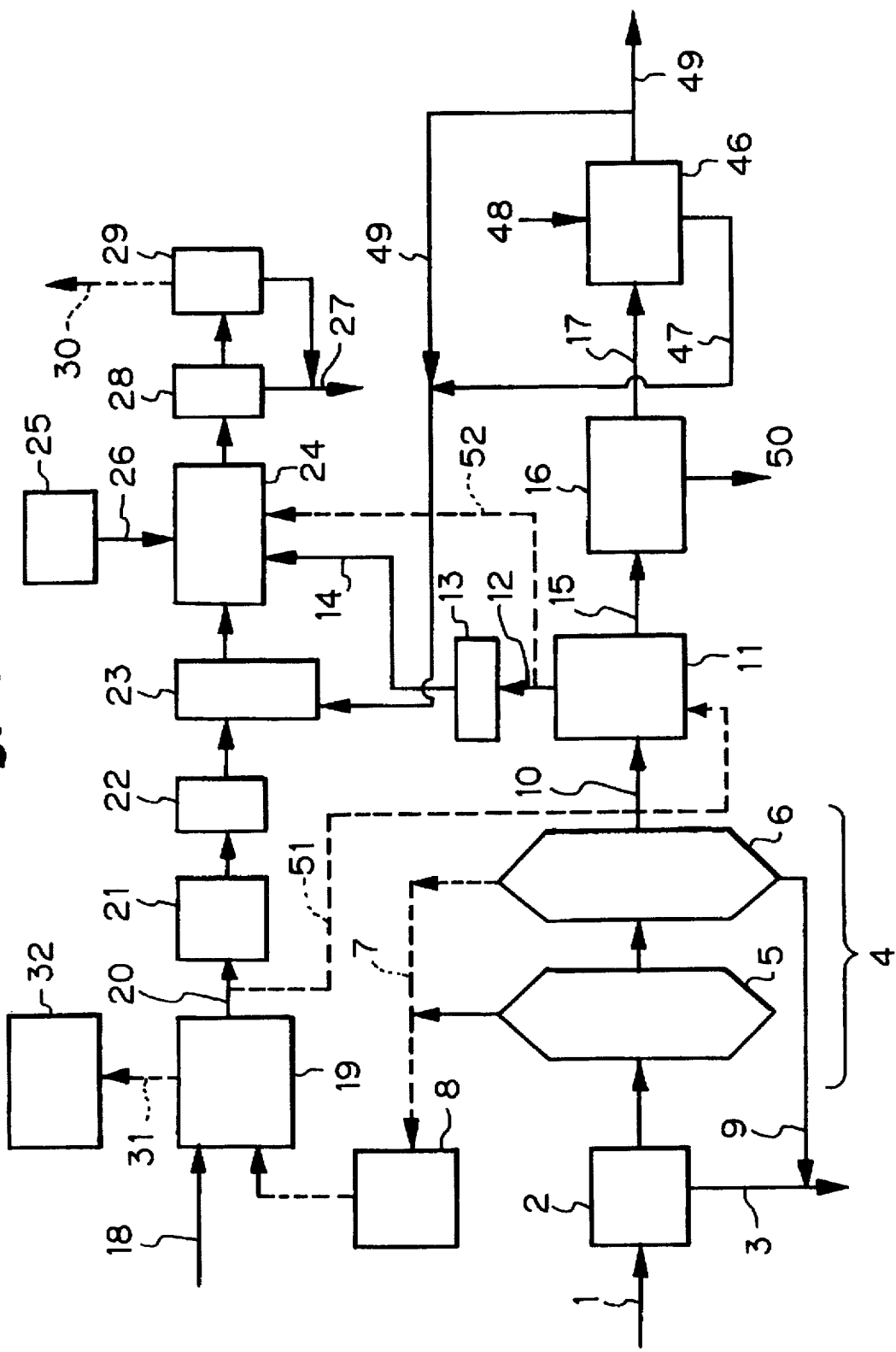
FIG. 3 is a flow sheet showing the treatment of an exhaust gas from a boiler in a coal-fired thermal power plant, as well as the treatment of night soil according to yet another embodiment of the invention.

In another line of the process shown in FIG. 3, a coal feed 18 is used as a fuel for a boiler 19, which discharges an exhaust gas 20, which in turn is freed of dust particles with an electric precipitator 21, subjected to heat exchange with boiler air in an air preheater 22, has its temperature adjusted to about 55°–75° C. in the cooling tower 23 and fed into the exhaust gas treatment step 24, where aqueous ammonia 14 is injected and the exhaust gas is exposed to an electron beam 26 from an electron beam generator 25, thereby yielding ammonium compounds (ammonium sulfate and ammonium nitrate).

The following Examples are provided for the purpose of further illustrating the present invention but are not to be constructed as limiting.

EXAMPLE 1

Example 1 was implemented according to the process shown in FIG. 1. An exhaust gas (100,000 m³/h) from a boiler at coal-fired thermal power plant (30,000 KW) having 132° C. was freed of dust particles with an electric precipitator, subjected to heat exchange with boiler air in an air preheater, has its temperature adjusted in a cooling tower of water-sprayed, complete evaporation type to control at 55°–75° C. with 3,640 kg/h of cooling water and fed into the exhaust gas treatment step, where ammonia gas or aqueous ammonia was injected and the exhaust gas was exposed to an electron beam from an electron beam generator, whereby yielding ammonia compounds (ammonium sulfate and ammonium nitrate). The concentration of SOx and NOx in the exhaust gas were 1800 ppm and 400 ppm, respectively. The electron beam generator was 800 kv×100 mA×3 units. The flow rate of the exhaust gas in the treatment step was about 10 m/sec. The injected ammonia was separated (12% by weight) from the supernatant liquor produced by anaerobic digestion of the night soil.

Night soil (1,400 kL/day) containing 4,200 mg/L ammoniacal nitrogen, having 11,000 mg/L of BOD and 14,000 mg/L of SS at a water temperature of about 20° C. was fed to a pretreatment step, where it was freed of coarse solid matter; thereafter, the night soil was fed into an anaerobic digestion step of dual-tank system consisting of the first tank (21,000 m³) and the second tank (21,000 m³), where the greater part of the organic matter in the night soil is degraded into methane, carbon dioxide, water, etc. at a temperature of 37°–38° C. For the period of treatment, 30 days was given. The dissolved ammonia was fed into an ammonia-stripping step together with a digested supernatant liquor such that it is subjected to two-stage concentration of a steam stripper. Ammonia in the vapor phase was fed together with water vapor, into a condensation step. The amount of aqueous ammonia injection was adjusted on the basis of detected concentrations of SOx and NOx. For further enhanced treatment of BOD and other residual organic compounds in the ammonia-stripped water which was fed into an aerobic biological treatment step of activated-sludge treatment (12-fold dilution) and then, the resulting water was flocculated, filtered and adsorpted on activated carbon, whereupon clean treated water of higher clarity was obtained.

The results of the treatment of the exhaust gas from the coal-fired boiler are set forth in Table 1, and those of the treatment of the night soil are shown in Table 2. From the data in Table 1, one can see that although the aqueous ammonia produced from the night soil was supplied as practically the sole source of ammonia, SOx rejections of at least 80% could be accomplished and, at the same time, NOx removal was also possible. From the data in Table 2, one can see that besides the enhanced rejection of BOD, CODcr and SS from the night soil, $NH_3$—N rejection of at least 80% was accomplished.

It was also found that ammonium sulfate and ammonium nitrate, both useful as a fertilizer, could be produced and that the biogas was effective in saving the coal feed to the boiler.

TABLE 1

Results of Exhaust Gas Treatment

|  | Before treatment | After treatment |
|---|---|---|
| SOx (ppm) | 1800 | 350 |
| NOx (ppm) | 400 | 360 |

TABLE 2

Results of Night Soil Treatment

|  | Night soil | Ammonia-stripped water | Activated-sludge treated water |
|---|---|---|---|
| BOD (mg/L) | 11000 | 900 | 12 |
| CODcr (mg/L) | — | — | 95 |
| SS (mg/L) | 14000 | — | 9 |
| $NH_3$—N (mg/L) | 4200 | 810 | 62 |

By-products

Ammonium sulfate: 20.7 t/day

Ammonium nitrate: 0.34 t/day

Biogas production: 11,200 m³/day

The utilization of the biogas was equivalent to supplying about 3% of the energy requirement of the boiler at the thermal power plant.

Figure 2:
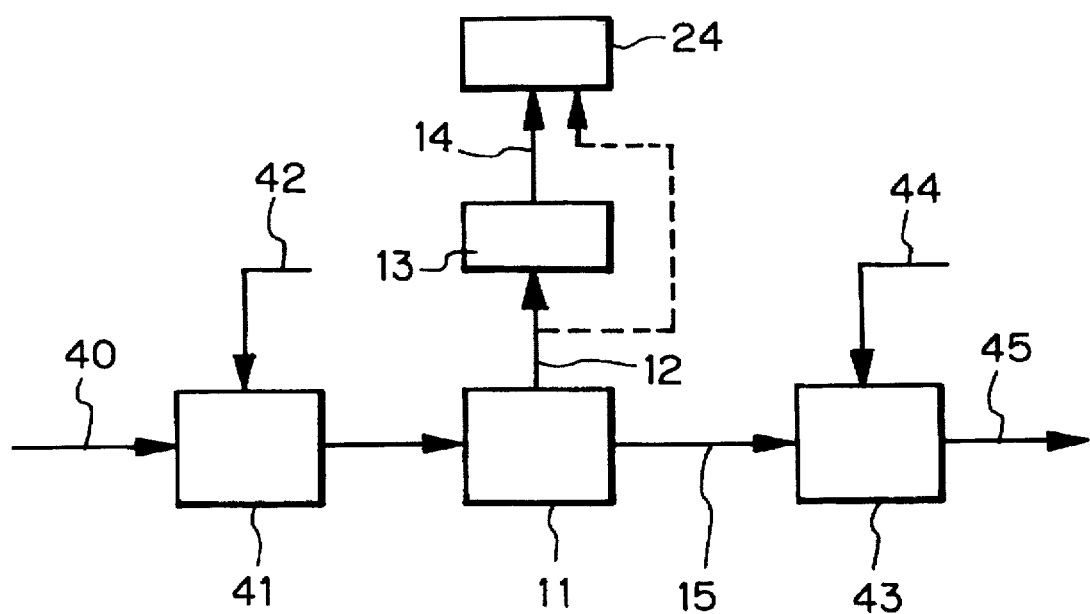
FIG. 2 is a flow sheet showing the treatment of low-pH wastewater according to another embodiment of the invention.

We now describe another example of the invention, in which industrial wastewater containing ammonium chloride as a major component was subjected to an activated-sludge treatment, followed by processing in accordance with the flow sheet shown in FIG. 2 to produce concentrated aqueous ammonia.

EXAMPLE 2

Industrial wastewater containing ammonium chloride as a major component was subjected to an activated-sludge treatment, followed by processing in accordance with the flow sheet shown in FIG. 2 to produce concentrated aqueous ammonia.

An influent (800 m³/day) of low pH (4.1) wastewater containing 5,800 mg/L of ammoniacal nitrogen and 4,300 mg/L of acetic acid was fed into an activated-sludge vessel (including a settling tank) in volume of 1,500 m³. The obtained treated water had pH: 6.0, an ammoniacal nitrogen level: 5,700 mg/L and an acetic acid level: 12 mg/L. The treated water was fed into a mixing tank, wherein 1,350 kg/day of sodium hydroxide was added to shift the pH of the water to the alkali side (pH: 11) before it is fed into the ammonia-stripping step of a two-stage concentration. The separated ammonia gas was condensed in a condensation step together with the accompanying water vapor of 30 m³/day to form aqueous ammonia containing 15% by weight of ammoniacal nitrogen. The ammonia-stripped water had an ammoniacal nitrogen level: 32 mg/L, pH: 7.7 (adjusted by addition of $H_2SO_4$), and a BOD level: 22 mg/L.

EXAMPLE 3

Example 3 was implemented according to the process shown in FIG. 3. An exhaust gas (100,000 m³/h) from a boiler at coal-fired thermal power plant (30,000 KW) having 132° C. was freed of dust particles with an electric precipitator, subjected to heat exchange with boiler air in an air preheater, has its temperature adjusted in a cooling tower of water-sprayed, complete evaporation type to control at 55°–75° C. with 3.75 m³/h of cooling flocculated sludge (flocculated sludge concentration: 1.5% by weight) and fed into the exhaust gas treatment step, where aqueous ammonia was injected and the exhaust gas was exposed to an electron beam from an electron beam generator, whereby yielding ammonia compounds (ammonium sulfate and ammonium nitrate). The concentration of SOx and NOx in the exhaust gas were 1800 ppm and 400 ppm, respectively. The electron beam generator was 800 kv×100 mA×3 units. The flow rate of the exhaust gas in the treatment step was about 10 m/sec.

Night soil (1,400 kL/day) containing 4,100 mg/L of ammoniacal nitrogen, having 11,000 mg/L of BOD, 14,000 mg/L of SS and 310 mg/L phosphorus at a water temperature of about 20° C. was fed to a pretreatment step, where it was freed of coarse solid matter; thereafter, the night soil was fed into an anaerobic digestion step of dual-tank system consisting of the first tank (21,000 m³) and the second tank (21,000 m³), where the greater part of the organic matter in the night soil is degraded into methane, carbon dioxide, water, etc. at a temperature of 37°–38° C. For the period of treatment, 30 days was given. The digested supernatant liquor was fed into an ammonia-stripping step together with steam from a boiler and bypass exhaust gas (20,000 m³/h) were subjected. Stripped ammonia gas was fed together with bypass exhaust gas and water vapor without passing through the condensation step into the exhaust gas treatment step. The amount of ammonia injection was adjusted on the basis of detected concentrations of SOx and NOx. For further enhanced treated of BOD and other residual organic compounds in the ammonia-stripped water which was fed into an aerobic biological treatment step of activated-sludge treatment effluent (1.5-fold dilution) and subjected to flocculation of the biological treatment by injection of ferric chloride at a rate of 3,000 mg/L (flocculation pH: 5.0) and subjected to separation by ultrafiltration membrane, whereupon clean treated water of higher clarity was obtained.

The results of the treatment of the exhaust gas from the coal-fired boiler are set forth in Table 3, and those of the treatment of the night soil are shown in Table 4. From the data in Table 3, one can see that although the aqueous ammonia produced from the night soil was supplied as practically the sole source of ammonia, SOx rejections of at least 80% could be accomplished and, at the same time, NOx removal was also possible. From the data in Table 4, one can see that besides the enhanced rejection of BOD, CODcr, SS and $PO_4^{3-}$—P from the night soil, $NH_3$—N rejection of at least 80% was accomplished. It was also found that ammonium sulfate, ammonium nitrate and phosphorus-containing solid matter, all being useful as a fertilizer, could be produced and that the biogas was effective in saving coal feed to the boiler.

TABLE 3

Results of Exhaust Gas Treatment

|  | Before treatment | After treatment |
|---|---|---|
| SOx (ppm) | 1800 | 290 |
| NOx (ppm) | 400 | 300 |

TABLE 4

Results of Night Soil Treatment

|  | Night soil | Ammonia-stripped water | Activated-sludge treated water | Water from the flocculation step |
|---|---|---|---|---|
| BOD (mg/L) | 11000 | 1090 | 135 | 25 |
| CODcr (mg/L) | — | — | 1200 | 130 |
| SS (mg/L) | 13000 | — | 120 | 15 |
| $NH_3$—N (mg/L) | 4100 | 750 | 450 | 440 |
| $PO_4^{3-}$—P (mg/L) | 310 | 290 | 170 | 0.9 |

By-Products

Ammonium sulfate: 16.6 t/day

Ammonium nitrate: 0.27 t/day

Phosphorus-containing solid matter: 1.8 t/day (P content, 11.2%)

Biogas production: 11,200 m³/day

The utilization of the biogas was equivalent to supplying about 3% of the energy requirement of the boiler at the thermal power plant.

The present invention has the following advantages. (1) The cost of ammonia which accounts for the greater part of the operating cost of the apparatus for treating exhaust gases by exposure to electron beams can be curtailed or completely eliminated. (2) The ammonia separated from ammonia-containing foul water has been difficult to treat in the prior art but, in the present invention, this can be easily put to effective use, so the treatment of ammonia in wastewater can be accomplished in a simpler and yet by far economical manner than in the prior art. In addition, the combination with the wastewater treatment enables desulfurization and denitrification to be accomplished by exposure to an electron beam even in locations where it is difficult to secure the supply of cooling water. (3) Ammonium sulfate, ammonium nitrate and, optionally, phosphorus-containing solid matter, all of which are useful as a fertilizer, can be produced in one process without employing any complicated steps such as concentration, formation and crystallization. (4) The biogas which is generated in the anaerobic treatment of organic liquid waste can be effectively utilized without subjecting it to desulfurization. (5) If a flocculated sludge is used as cooling water, it can be easily dried although it is inherently difficult to dehydrate; in addition, if this practice is adopted in the treatment of phosphorus-containing wastewater, there can be produced dried solid matter having a high phosphorus content which is useful as a fertilizer.

What is claimed is:

1. A method for treating ammonia-containing foul water and for treating exhaust gas from a combustion apparatus, comprising:

(a) removing coarse solid matter from an organic ammonia-containing influent water of night soil to obtain ammonia-containing effluent, subjecting the said effluent to an anaerobic digestion to degrade organic matter to obtain methane, carbon dioxide and water containing ammonia, and transferring said methane and carbon dioxide from said water containing ammonia into a vapor phase;

(b) recovering ammonia in vapor phase from said water containing ammonia by ammonia stripping, leaving ammonia-stripped water;

(c) condensing said ammonia in vapor phase to form an aqueous ammonia;

(d) treating said ammonia-stripped water with aerobic bacteria to provide biologically treated water;

(e) subjecting said biologically treated water to flocculation to form phosphorous flocculation-containing water;

(f) removing dust particles, using an electric precipitator, from an exhaust gas produced from combustion of a fossil fuel to provide a dust particle-free exhaust gas;

(g) subjecting said dust particle-free exhaust gas to heat exchange with boiler air in an air preheater to provide a heat-exchanged exhaust gas;

(h) cooling said heat-exchanged exhaust gas from step (g) with said phosphorous flocculation-containing water formed in step (e) to provide a cooled exhaust gas; and (i) exposing said cooled exhaust gas to an electron beam from an electron generator in contact with ammonia obtained from said ammonia-stripping step (c), to obtain ammonium compounds.

2. The method of claim 1 wherein part of the exhaust gas before it is freed of dust particles with the electric precipitator in the above step (f) is supplied to said ammonia-stripping.

3. The method of claim 1 wherein noncondensable ammonia in the above step (c) is supplied directly into the step (i).

4. The method of claim 1 wherein when the recovered water in the above step (e) contains high levels of NaCl, the water is subjected to a desalting treatment comprising reverse osmosis or electrodialysis to produce desalted water.

5. The method of claim 1 wherein the methane obtained in the above step (a) is used as a source of energy for the combustion apparatus.

* * * * *